(12) United States Patent
Harrington et al.

(10) Patent No.: US 8,746,374 B2
(45) Date of Patent: Jun. 10, 2014

(54) METHOD AND APPARATUS FOR REDUCING LUBRICANT PRESSURE PULSATION WITHIN A ROTARY CONE ROCK BIT

(75) Inventors: David Harrington, Dallas, TX (US); Thomas Gallifet, Garland, TX (US); Xiaobin Lu, Coppell, TX (US)

(73) Assignee: Varel International Ind., L.P., Carrollton, TX (US)

( * ) Notice: Subject to any disclaimer, the term of this patent is extended or adjusted under 35 U.S.C. 154(b) by 647 days.

(21) Appl. No.: 13/016,535

(22) Filed: Jan. 28, 2011

(65) Prior Publication Data

US 2012/0193151 A1 Aug. 2, 2012

(51) Int. Cl.
*E21B 10/22* (2006.01)

(52) U.S. Cl.
USPC .......................................... 175/359; 175/371

(58) Field of Classification Search
USPC ..................... 175/371, 359; 384/94
See application file for complete search history.

(56) References Cited

U.S. PATENT DOCUMENTS

| | | | |
|---|---|---|---|
| 3,476,446 A | 11/1969 | Neilson | |
| 3,746,405 A | 7/1973 | Welton | |
| 3,844,363 A | 10/1974 | Williams, Jr. | |
| 3,866,695 A | 2/1975 | Jackson | |
| 3,890,018 A | 6/1975 | Clamon | |
| 3,923,108 A | 12/1975 | Williams, Jr. | |
| 4,019,785 A | 4/1977 | Stinson et al. | |
| 4,061,376 A | 12/1977 | Villaloboz | |
| 4,167,219 A * | 9/1979 | McQueen | 384/93 |
| 4,244,430 A | 1/1981 | Raiburn | |
| 4,572,306 A | 2/1986 | Dorosz | |
| 4,657,091 A | 4/1987 | Higdon | |
| 4,765,205 A | 8/1988 | Higdon | |
| 4,880,068 A * | 11/1989 | Bronson | 175/369 |
| 5,360,076 A | 11/1994 | Kelly, Jr. et al. | |
| 5,465,800 A * | 11/1995 | Pearce et al. | 175/368 |
| 5,931,241 A * | 8/1999 | Daly | 175/227 |
| 6,170,582 B1 | 1/2001 | Singh et al. | |
| 6,427,790 B1 * | 8/2002 | Burr | 175/371 |
| 6,695,079 B2 * | 2/2004 | Portwood et al. | 175/371 |
| 7,237,627 B2 | 7/2007 | Richman et al. | |
| 7,461,708 B2 * | 12/2008 | Yong et al. | 175/371 |
| 7,543,660 B2 * | 6/2009 | Crawford et al. | 175/371 |
| 2005/0045387 A1 | 3/2005 | Oliver et al. | |

(Continued)

OTHER PUBLICATIONS

International Search Report and Written Opinion for PCT/US2011/059187 mailed Jun. 11, 2012 (10 pages).

*Primary Examiner* — Shane Bomar
*Assistant Examiner* — Kipp Wallace
(74) *Attorney, Agent, or Firm* — Gardere Wynne Sewell LLP; Andre M. Szuwalski

(57) ABSTRACT

A drill tool comprises includes a bit body, at least one bearing shaft extending from the bit body and a cone mounted for rotation on the bearing shaft. The bearing system for the tool includes a radial thrust bearing from which cone pumping pressure pulsation originates. A lubricant sealing system including an annular seal gland and a seal ring retained within the annular seal gland functions to retain lubricant in the bearing system. The tool further includes a lubricant cone pumping pressure restrictor system formed by an annular gland (separate from the annular seal gland) and a pressure restricting ring retained within the annular gland. The lubricant cone pumping pressure restrictor system is positioned between the radial thrust bearing system and the lubricant sealing system and is adapted to attenuate cone pumping lubricant pressure pulsation from acting on the seal ring retained within the annular seal gland.

36 Claims, 11 Drawing Sheets

(56) References Cited

U.S. PATENT DOCUMENTS

| | | |
|---|---|---|
| 2005/0077087 A1 | 4/2005 | Richman et al. |
| 2005/0183888 A1 | 8/2005 | Dick et al. |
| 2006/0096782 A1 | 5/2006 | Neville et al. |
| 2009/0205873 A1 | 8/2009 | Dick et al. |
| 2010/0089657 A1* | 4/2010 | Lin .............................. 175/371 |

* cited by examiner

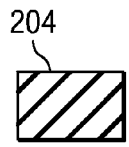  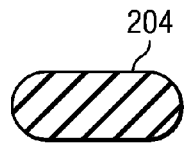 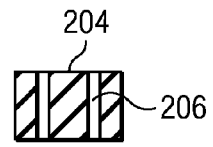
*FIG. 5A*   *FIG. 5B*   *FIG. 5C*   *FIG. 5D*
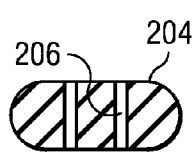 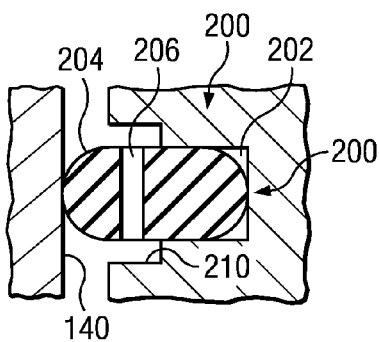 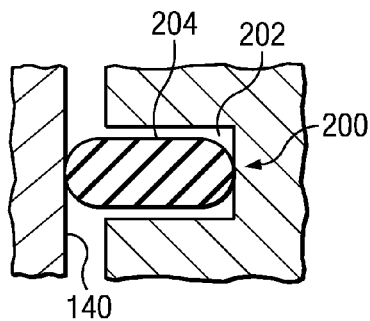
*FIG. 5E*   *FIG. 5F*   *FIG. 5G*
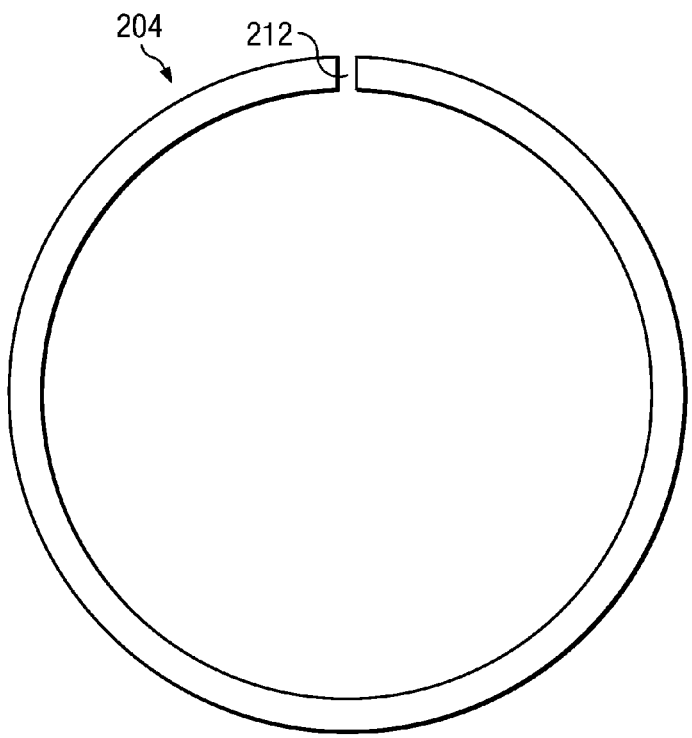
*FIG. 6*

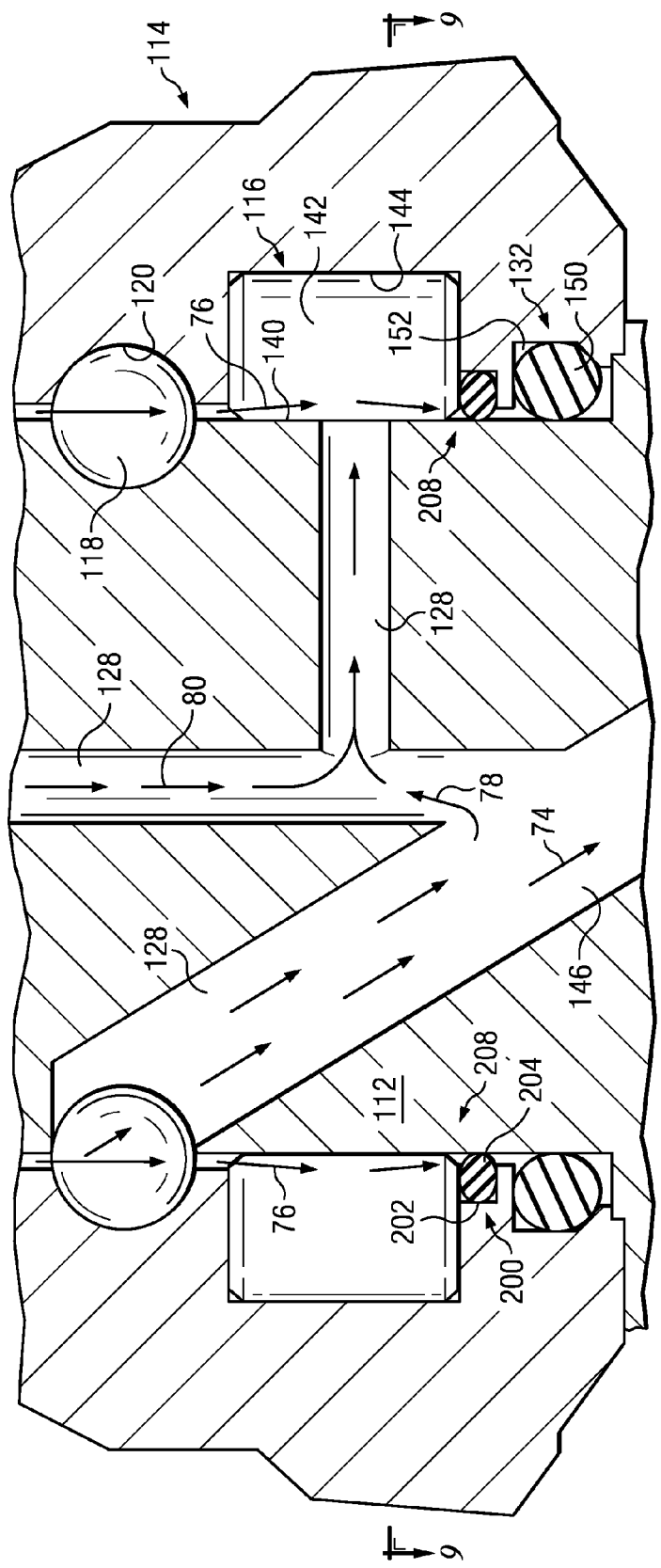
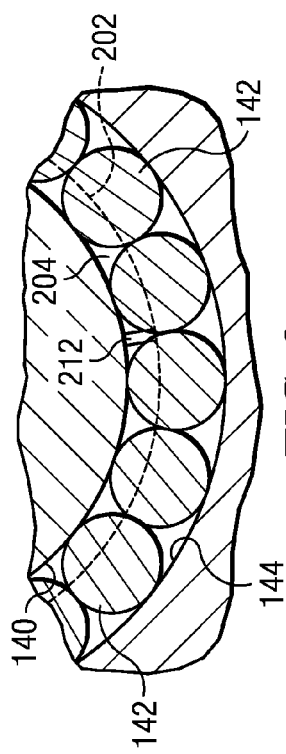
FIG. 8
FIG. 9

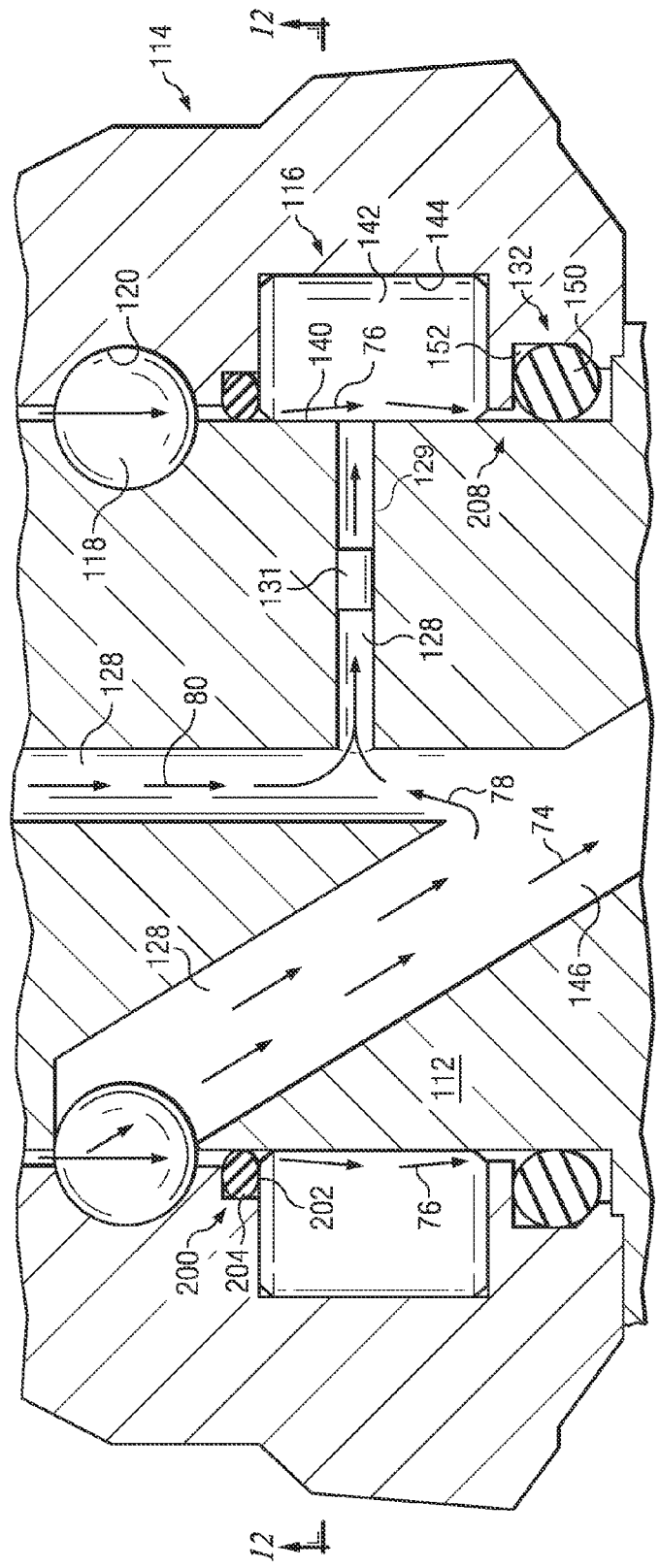
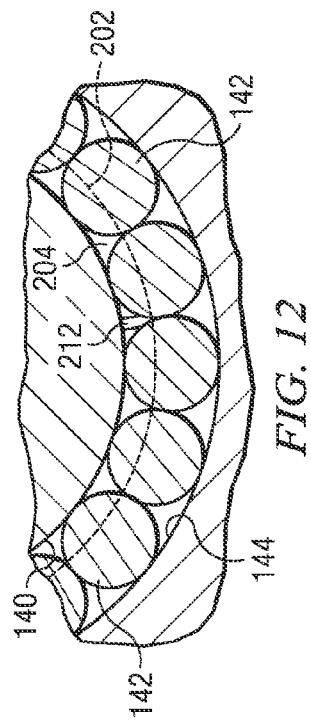
FIG. 11
FIG. 12

METHOD AND APPARATUS FOR REDUCING LUBRICANT PRESSURE PULSATION WITHIN A ROTARY CONE ROCK BIT

TECHNICAL FIELD

The present invention relates generally to rock bit drilling tools, and more specifically concerns roller cone drilling tools and the lubrication and pressure compensation systems used within such roller cone drilling tools.

BACKGROUND

A roller cone rock bit is a commonly used cutting tool used in oil, gas, and mining fields for breaking through earth formations and shaping well bores. Reference is made to FIG. 1 which illustrates a cross-sectional view of a portion of a typical roller cone rock bit. FIG. 1 specifically illustrates the portion comprising one head and cone assembly of the bit. The general configuration and operation of such a bit is well known to those skilled in the art.

The head 10 of the bit includes a downwardly and inwardly extending bearing shaft 12. A cutting cone 14 is rotatably mounted on the bearing shaft 12. The bearing system for the head and cone assembly that is used in roller cone rock bits to rotatably support the cone 14 on the bearing shaft 12 typically employs either rollers as the load carrying element (a roller bearing system) or a journal as the load carrying element (a friction bearing system). FIG. 1 specifically illustrates a roller bearing implementation including a bearing system defined by a first roller bearing 16 (also referred to as the main roller bearing). The cone 14 is axially retained on the bearing shaft 12, and further supported for rotation, by a set of ball bearings 18 that ride in the annular raceway 20 defined at an interface between the bearing shaft 12 and cone 14. The ball bearings 18 are delivered to the raceway 20 through a ball opening 46, with that opening 46 being closed by a ball plug 48. The ball plug 48 is shaped to define a portion of the lubricant channels 28 within the ball opening 46. The ball bearing system as shown would typically also be present in bearing system implementations which utilize friction journal bearings. The bearing system for the head and cone assembly further includes second roller bearing 22, first radial friction (thrust) bearing 24 and second radial friction (thrust) bearing 26.

The bearing system for the head and cone assembly of the bit is lubricated and sealed. The interstitial volume within the bearing system defined between the cone 14 and the bearing shaft 12 is filled with a lubricant (typically, grease). This lubricant is provided to the interstitial volume through a series of lubricant channels 28. A pressure compensator 30, usually including an elastomer diaphragm, is coupled in fluid communication with the series of lubricant channels 28. The lubricant is retained within the bearing system by a sealing system 32 provided between the base of the cone 14 and the base of the bearing shaft 12. The configuration and operation of the lubrication and sealing systems within roller cone drill bits are well known to those skilled in the art.

A body portion 34 of the bit, from which the head and cone assembly depends, includes an upper threaded portion forming a tool joint connection which facilitates connection of the bit to a drill string (not shown, but well understood by those skilled in the art).

FIG. 2 illustrates a cross-sectional view of the bit shown in FIG. 1 focusing on a bearing shaft and cone in greater detail. The first roller bearing (main roller bearing) 16 is defined by an outer cylindrical surface 40 on the bearing shaft 12 and a set of roller bearings 42 provided within an annular roller raceway 44 in the cone 14. In a friction journal bearing system, the outer cylindrical surface 40 on the bearing shaft 12 would interact with an inner cylindrical surface of the cone 14 or a bushing (a ring-shaped structure typically made of beryllium copper) that is press fit into an annular aperture formed in the cone 14.

As discussed above, lubricant is retained within the bearing system by a sealing system 32. The sealing system 32, in a basic configuration, comprises an o-ring type seal member 50 positioned in a seal gland 52 between the cutter cone 14 and the bearing shaft 12 to retain lubricant and exclude external debris. A cylindrical sealing surface 54 is provided at the base of the bearing shaft 12. The annular seal gland 52 is formed in the base of the cone 14. The gland 52 and sealing surface 54 align with each other when the cutting cone 14 is rotatably positioned on the bearing shaft 12. The o-ring sealing member 50 is compressed between the surface(s) of the gland 52 and the sealing surface 54, and functions to retain lubricant within the bearing system. This sealing member 50 also prevents materials from the well bore (such as drilling mud and debris) from entering into the bearing system.

Over time, the rock bit industry has moved from a standard nitrile material for the seal member 50, to a highly saturated nitrile elastomer for added stability of properties (thermal resistance, chemical resistance). The use of a sealing system 32 in rock bit bearings has dramatically increased bearing life in the past fifty years. The longer the sealing system 32 functions to retain lubricant within the interstitial volume, and exclude contamination of the bearing system, the longer the life of the bearing and drill bit. The sealing system 32 is, thus, a critical component of the rock bit.

The second roller bearing 22 of the bearing system is defined by an inner cylindrical surface 60 on the cone 14 and a set of roller bearings 62 provided within an annular roller raceway 64 in the bearing shaft 12. The first radial friction (thrust) bearing 24 of the bearing system is defined between the first and second cylindrical friction bearings 16 and 22 by a first radial surface 66 on the bearing shaft 12 and a second radial surface 68 on the cone 14. The second radial friction (thrust) bearing 26 of the bearing system is adjacent the second roller bearing 22 at the axis of rotation for the cone and is defined by a third radial surface 70 on the bearing shaft 12 and a fourth radial surface 72 on the cone 14.

The lubricant is provided in the interstitial volume that is defined between the surface 40 and raceway 44 of the first roller bearing 16, the surface 60 and raceway 64 of the second roller bearing 22, the surfaces 66 and 68 of the first radial friction bearing 24 and the surfaces 70 and 72 of the second radial friction bearing 26. The sealing system 32 with the o-ring type seal member 50 positioned in the seal gland 52 functions to retain the lubricant within the lubrication system and specifically between the opposed surfaces of the bearing system.

During operation of the bit, the rotating cone 14 oscillates along the head in at least an axial manner. This motion is commonly referred to in the art as a "cone pump." Cone pumping is an inherent motion resulting from the external force that is imposed on the cone by the rocks during the drilling process. The oscillating frequency of this cone pump motion with respect to the head is related to the rotating speed of the bit. The magnitude of the oscillating cone pump motion is related to the manufacturing clearances provided within the bearing system (more specifically, the manufacturing clearances between the surface 40 and raceway 44 of the first roller bearing 16, the surface 60 and raceway 64 of the second roller bearing 22, the surfaces 66 and 68 of the first radial friction bearing 24 and the surfaces 70 and 72 of the second radial friction bearing 26). The magnitude is further influenced by the geometry and tolerances associated with the retaining system for the cone (for example, the ball race). When cone pump motion occurs, the interstitial volume defined between the foregoing cylindrical and radial surfaces of the bearing system changes. This change in volume squeezes the lubricant provided within the interstitial volume.

The change in interstitial volume and squeezing of the lubricant grease results in the generation of a lubricant pressure pulse (that pulse generally originating at or near the radial thrust bearings). Over a very short period of time, responsive to this pressure pulse, grease flows along a first path 74 between the bearing system and the pressure compensator 30 through the series of lubricant channels 28 (see, also FIG. 1). The pressure compensator 30 is designed to relieve or dampen the pressure pulse by compensating for volume changes through its elastomer diaphragm. However, it is known in the art that the pressure pulse, notwithstanding the presence and actuation of the pressure compensator 30, can also be felt at the sealing system 32 due to the presence of other paths for the flow of grease, responsive to this pressure pulse, between the opposed surfaces of the bearing system and the sealing system 32. For example, grease may flow along a second path 76 through the raceway 20 and along the surface 40 between the bearing system and the sealing system 32. Additionally, grease may flow along a third path 78 between the bearing system and the sealing system 32 through the raceway 20, the series of lubricant channels 28 and along the surface 40. Still further, grease may flow along a fourth path 80 between the bearing system and the sealing system 32 through the raceway 64, the series of lubricant channels 28 and along the surface 40.

The flow of grease along the second through fourth (and perhaps other) paths in response to the pressure pulse is known to be detrimental to seal operation and can also reduce seal life. For example, positive and negative pressure pulses due to cone pump motion may cause movement of the sealing member 50 within the seal gland. A nibbling and wearing of the seal member 50 may result from this movement. Additionally, a positive pressure pulse due to cone pump motion may cause lubricant grease to leak out past the sealing system 32. A negative pressure pulse due to cone pump motion may pull materials in the well bore (such as drilling mud and debris) past the sealing system 32 and into the bearing system.

Reference is now made to FIG. 3 which shows a cross-section of a portion of a bit with a cylindrical friction bearing (also referred to as the main journal bearing). The cylindrical friction bearing 16' is defined by an outer cylindrical surface 40' on the bearing shaft 12 and an inner cylindrical surface 42' of a bushing 44' which has been press fit into the cone 14. This bushing 44' is a ring-shaped structure typically made of beryllium copper, although the use of other materials is known in the art. Ball bearings 18 ride in an annular raceway 20 defined at an interface between the bearing shaft 12 and cone 14. The ball bearings 18 are delivered to the raceway 20 through a ball opening 46, with that opening 46 being closed by a ball plug 48. The ball plug 48 is shaped to define a portion of the lubricant channels 28 within the ball opening 46.

Cone pumping is also a concern in bits using the cylindrical friction bearing 16'. Again, responsive to this pressure pulse (generally originating at or near the radial thrust bearings), grease flows along a first path 74 between the bearing system (for example, the thrust bearing surfaces) and the pressure compensator 30 through the series of lubricant channels 28 (see, also FIG. 1). The pressure compensator 30 is designed to relieve or dampen the pressure pulse by compensating for volume changes through its elastomer diaphragm. However, it is known in the art that the pressure pulse, notwithstanding the presence and actuation of the pressure compensator 30, can also be felt at the sealing system 32 due to the presence of other paths for the flow of grease. For example, grease may flow along a second path 76 through the raceway 20 and along the surface 40' between the bearing system and the sealing system 32. Additionally, grease may flow along a third path 78 between the bearing system and the sealing system 32 through the raceway 20, the series of lubricant channels 28 and along the surface 40'.

As discussed above, this pressure pulse may have detrimental effects on the sealing system 32 and particularly the sealing member 50. There is accordingly a need in the art to reduce, or eliminate, the pressure pulsation due to cone pumping from acting on the sealing system 32.

SUMMARY

In an embodiment, a drill tool comprises: a bit body; at least one bearing shaft extending from the bit body; a cone mounted for rotation on the bearing shaft; a radial thrust bearing from which cone pumping pressure pulsation originates; a lubricant sealing system comprising an annular seal gland and a seal ring retained within the annular seal gland; and a lubricant cone pumping pressure restrictor system comprising an annular gland separate from the annular seal gland and a pressure restricting ring retained within the annular gland. The lubricant cone pumping pressure restrictor system is positioned between the radial thrust bearing system and the lubricant sealing system and is adapted to attenuate cone pumping lubricant pressure pulsation from acting on the seal ring retained within the annular seal gland.

BRIEF DESCRIPTION OF THE DRAWINGS

FIGS. 4, 7-8, 10-11 and 13-14 illustrate cross-sectional views of a roller cone rock bit focusing on embodiments of the present invention for addressing lubricant pressure pulsation originating at the bearing system;

FIGS. 5A to 5E illustrate different configurations for a pressure restricting member of an o-ring type;

FIG. 5F illustrates installation of the restricting member of FIG. 5E in a restrictor gland;

FIG. 5G illustrates installation of the restricting member of FIG. 5C in a restrictor gland;

FIG. 6 illustrates a pressure restricting member of a split-ring type;

FIG. 9 is a partial cross-sectional view of FIG. 8; and

FIG. 12 is a partial cross-sectional view of FIG. 11.

DETAILED DESCRIPTION OF THE DRAWINGS

Figure 1:
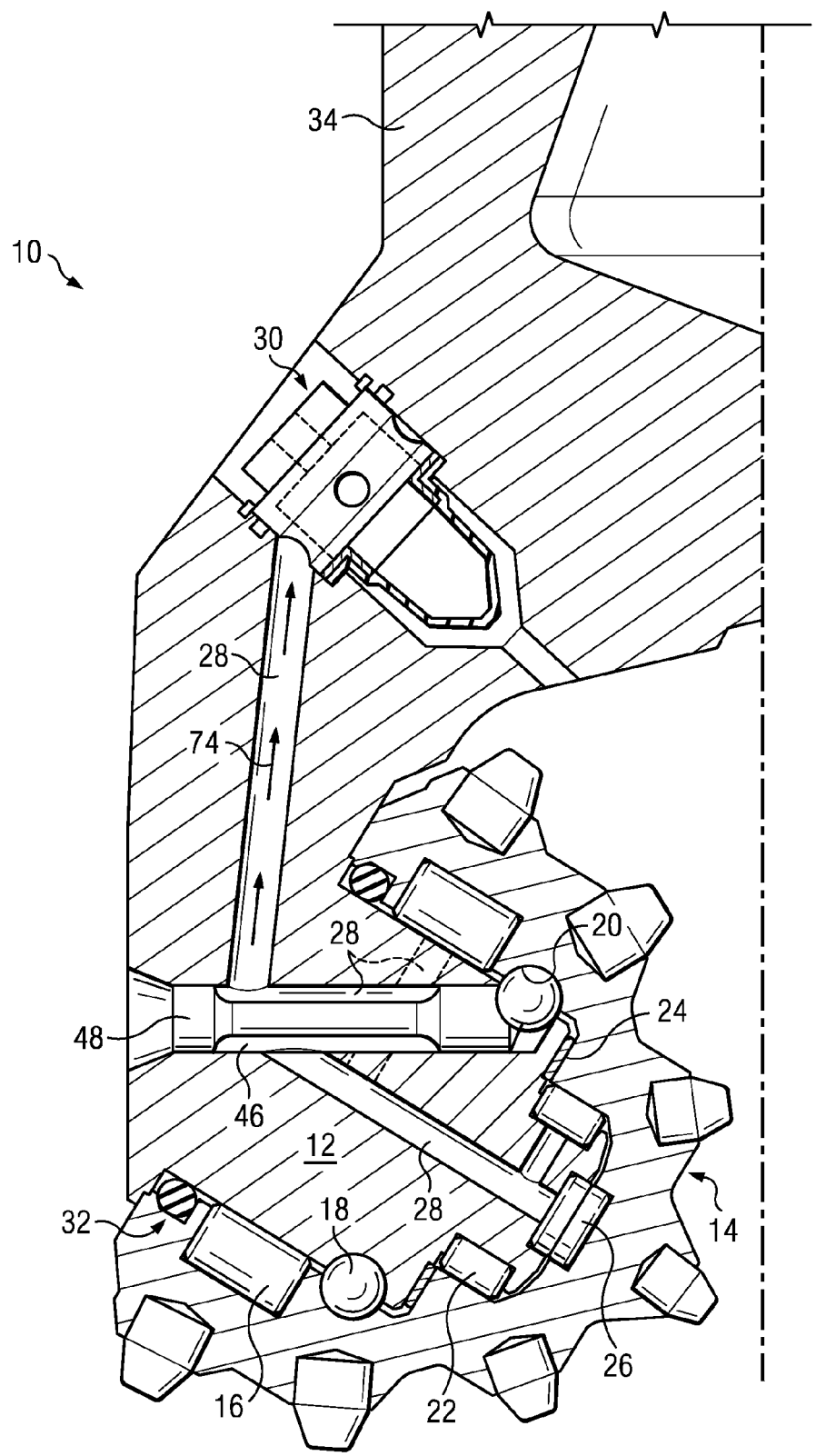
FIG. 1 illustrates a cross-sectional view of a portion of a typical roller cone rock bit.
Figure 2:
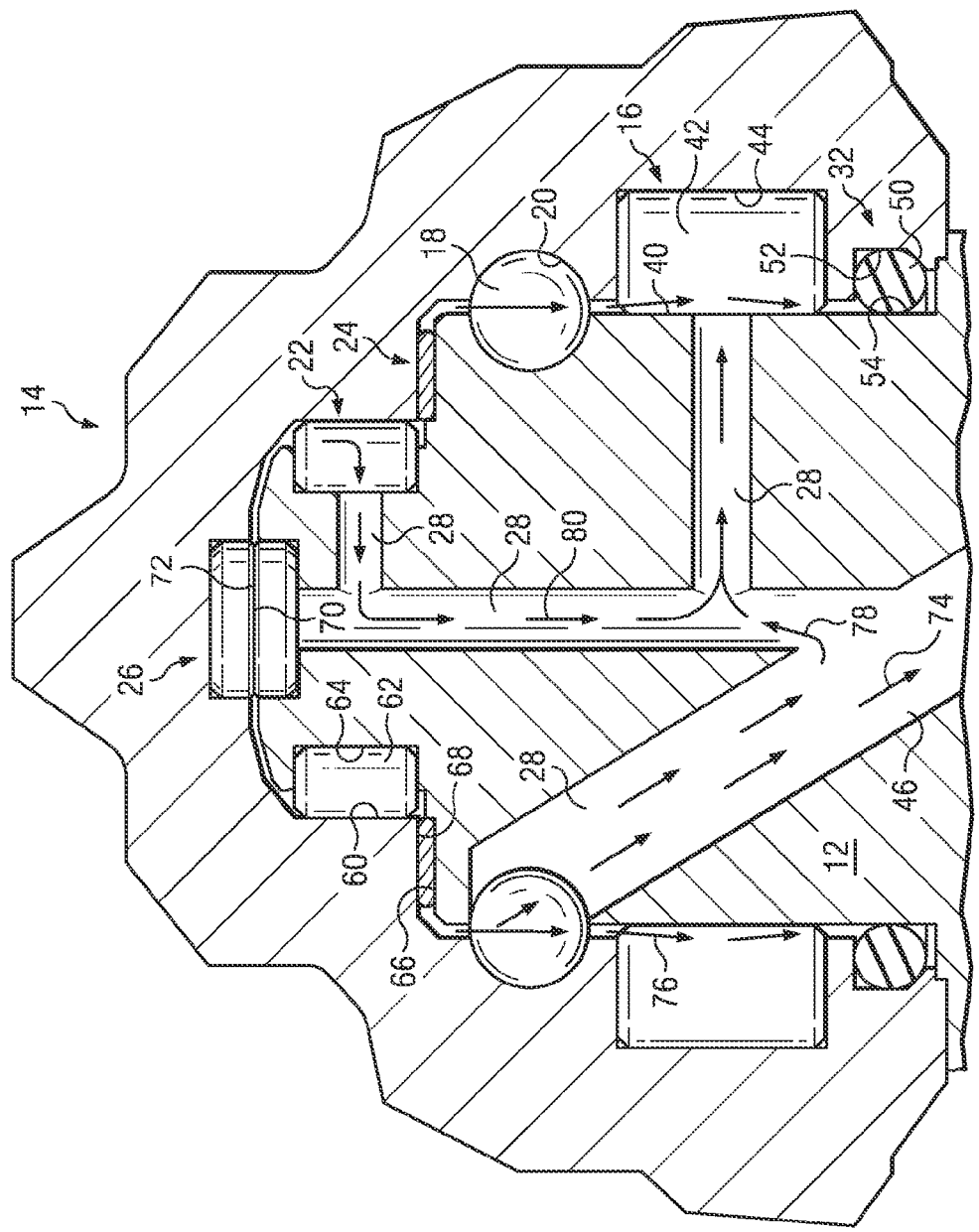
FIG. 2 illustrates a cross-sectional view of the bit shown in FIG. 1 focusing on a bearing shaft and cone in greater detail.
Figure 3:
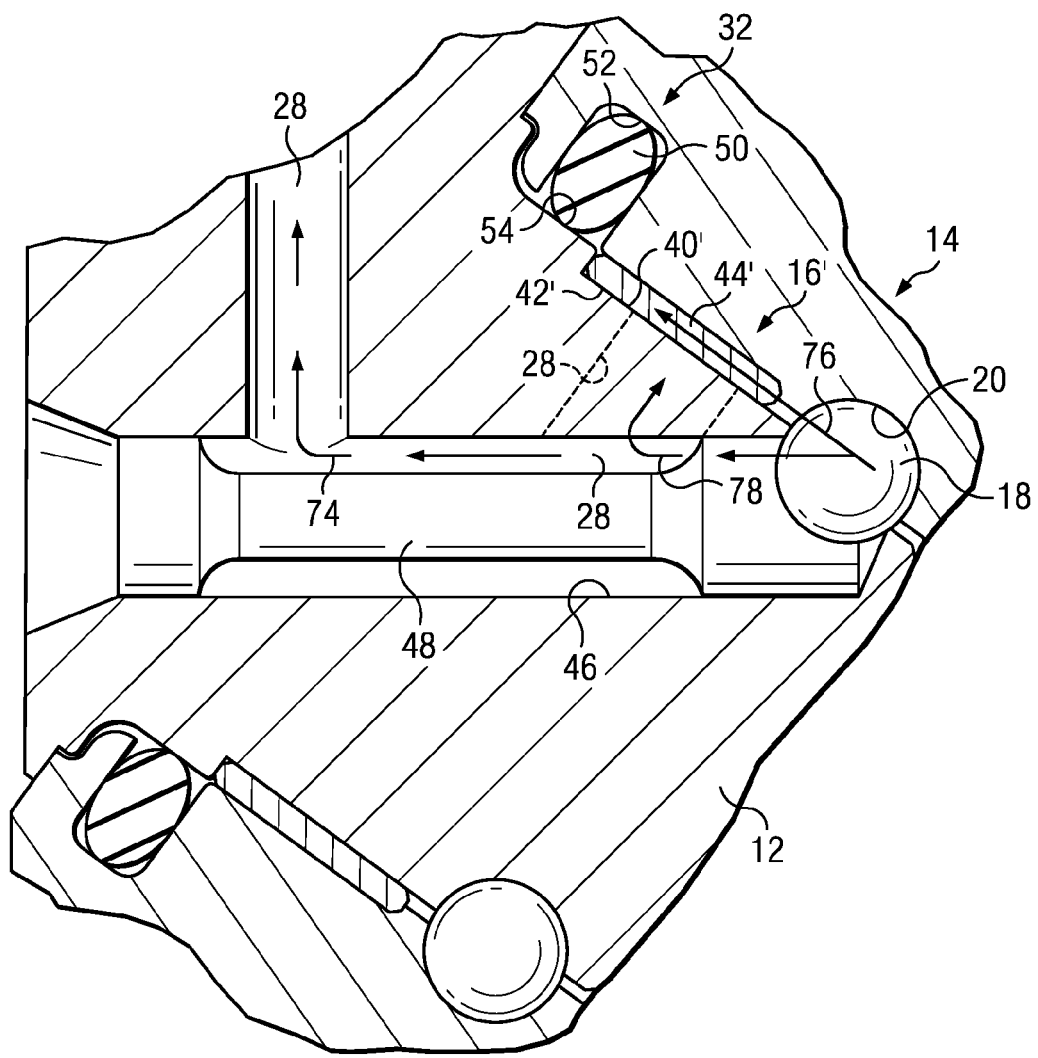
FIG. 3 illustrates a cross-section of a portion of a bit with a cylindrical friction bearing.
Figure 4:
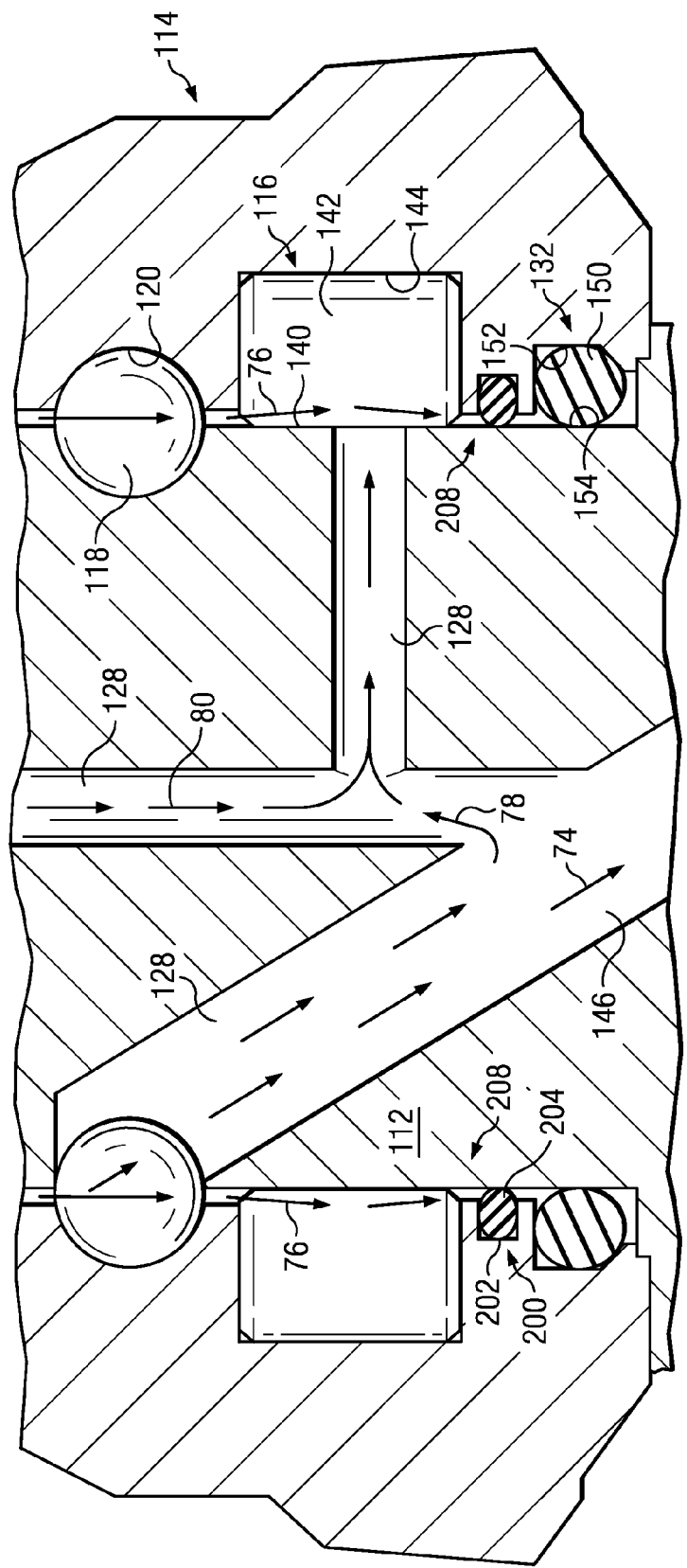

FIG. 4 illustrates a cross-sectional view of a roller cone rock bit focusing on an embodiment of the present invention for addressing lubricant pressure pulsation originating at the bearing system. FIG. 4 is specifically directed to the area of the main bearing 116 and sealing system 132. The main bearing 116, in the illustrated example, is defined by an outer cylindrical surface 140 on a bearing shaft 112 and a set of roller bearings 142 provided within an annular roller raceway 144 in the cone 114. The bearing system further includes ball bearings 118 which ride in an annular raceway 120 defined at the interface between the bearing shaft 112 and cone 114. The ball bearings 118 are delivered to the raceway 120 through a ball opening 146, with that opening 146 being closed by a ball plug (not shown, see reference 48, FIG. 1). The ball plug is shaped to define a portion of a lubricant channel 128.

Lubricant is provided in the interstitial volume between the surface 140 and the raceway 144 of the roller bearing 116 as well as in the annular raceway 120 and other opposed cylindrical and radial bearing surfaces (as discussed above) between the cone 114 and the shaft 112. The lubricant is retained within the bearing system by a sealing system 132. The sealing system 132, in a basic configuration, comprises an o-ring type seal member 150 positioned in a seal gland 152 between the cutter cone 114 and the bearing shaft 112 to retain lubricant and exclude external debris. A cylindrical sealing surface 154 is provided at the base of the bearing shaft 112. The annular seal gland 152 is formed in base of the cone 114. The gland 152 and sealing surface 154 align with each other when the cutting cone 114 is rotatably positioned on the bearing shaft 112. The o-ring sealing member 150 is compressed between the surface(s) of the gland 152 and the sealing surface 154, and functions to retain lubricant within the bearing system. This sealing member 150 also prevents materials (drilling mud and debris) in the well bore from entering into the bearing system.

The bit further includes a pressure restrictor system 200. The system 200 includes an additional annular gland 202 that is formed near the base of the cone 114 between the annular seal gland 152 and the annular roller raceway 144. A ring type pressure restricting member 204 is positioned in the gland 202. FIGS. 5A to 5E illustrate different configurations for the pressure restricting member 204. The pressure restricting member 204 may have any suitable cross-section including rectangular, oval and circular, and be made of any suitable material including elastomer, plastic, metal, ceramic, composite or combinations thereof. The pressure restricting member 204 is typically solid and is configured to achieve a desired pressure (or flow) restriction in the manner described below. Alternatively, the ring type pressure restricting member 204 may include one or more fluid communication passages 206. When installed in the annular gland 202, the passages 206 are oriented generally parallel to the outer cylindrical surface 140 of the bearing shaft 112. The size of the passages 206 in the ring pressure restricting member 204 is selected to achieve a desired pressure (or flow) restriction in the manner described below. Alternatively, the pressure restricting member 204 may comprise a split ring member as shown in FIG. 6. The width of the gap 212 in the split ring pressure restricting member 204 is selected to achieve a desired pressure (or flow) restriction in the manner described below. Still further, the pressure restrictor system 200 may comprise other types of seals as conventionally used in roller cone rock bits including high aspect ratio elastomer seals, labyrinth seals, packing type seals, metal face seals, or mechanical seals, but configured for use in the pressure restrictor system 200 to permit restricted lubricant flow.

FIG. 5F illustrates installation of the restricting member 204 of FIG. 5E in an annular gland 202 of the pressure restrictor system 200. The restricting member 204 includes a fluid communication passage 206. The fluid communication passage 206 permits restricted passage of lubricant from one side of the pressure restrictor system 200 to the other side of the pressure restrictor system 200 along the surface 140. To ensure that the openings into fluid communication passage 206 are exposed to the lubricant, the annular gland 202 is configured with a step region 210 on either side of the restricting member 204. In this configuration, the edge of the restricting member 204 adjacent to surface 140 may provide a substantial sealing surface, with lubricant flow supported only through the fluid communication passage 206. Thus, the restricting member 204 may be compressed within the gland 202 and relative to surface 140.

FIG. 5G illustrates installation of the restricting member 204 of FIG. 5C in an annular gland 202 of the pressure restrictor system 200. As this restricting member 204 lacks a fluid communication passage 206 (compare to FIGS. 5E and 5F), the restricting member is configured for installation in the annular gland 202 in manner which permits restricted passage of lubricant from one side of the pressure restrictor system 200 to the other side of the pressure restrictor system 200 along the surface 140. The may be accomplished, for example, by setting the geometric relationship of the gland 202 to surface 140 such that a non-sealing compression is applied to the restricting member 204. The restricting member 204, in a non-sealing compressed, or perhaps uncompressed, state, will not function to form a seal, and thus will allow restricted lubricant flow around the restricting member 204 (for example, along surface 140 or along the inner surface of the gland 202). The amount of compression applied to the restricting member 204 is selected to achieve a desired pressure (or flow) restriction.

Reference is again made to FIG. 4. As discussed previously, cone pumping changes the interstitial volume between the cone 114 and shaft 112 and squeezes the lubricant grease resulting in the generation of a lubricant pressure pulse originating at or near the radial thrust bearings. Responsive to this pressure pulse, grease flows along a first path 74 between the bearing system and the pressure compensator 30 through the series of lubricant channels 28 (and 128) (see, also FIG. 1). The pressure compensator 30 is designed to relieve or dampen the pressure pulse by compensating for volume changes through its elastomer diaphragm. However, there are other possible paths for grease flow in response to the pressure pulse, and one or more of these paths are directed towards the sealing system 132. For example, grease may flow along a second path 76 through the raceway 120 and along the surface 140 towards the sealing system 132. Additionally, grease may flow along a third path 78 through the raceway 120, the series of lubricant channels 128 and along the surface 140 towards the sealing system 132. Still further, grease may flow along a fourth path 80 through the raceway 144, the series of lubricant channels 128 and along the surface 140 towards the sealing system 132.

The pressure restrictor system 200, positioned between the annular seal gland 152 and the annular roller raceway 144, functions to intercept and restrict the pressure pulse and the flow of grease in response thereto along the surface 140 before reaching the sealing system 132. In this configuration, the pressure restrictor system 200 supplements the restricting capabilities provided by attenuation zones 208 defined between outer surfaces of the shaft 112 that are adjacent inner surfaces of the cone 114. It is important to note that the pressure restrictor system 200 with restricting member 204 in annular gland 202 is not designed or configured to function as a seal with respect to the lubricant. Passage of lubricant from one side to the other side of the restricting member 204 along surface 140 (or through the passages 206 or slots 212 or around the member 204) is permitted (i.e., the restricting member 204 is "leaky"), but the restricting member 204 nonetheless restricts or attenuates grease flow along surface 140 in response to cone pumping pressure pulsation.

Separation of the pressure restrictor system 200 from the annular seal gland 152 (and o-ring sealing member 150) is important. The grease flow in response to the cone pumping pressure pulse pressure acts on the restrictor system 200 and may cause movement of the restricting member 204. The placement of the pressure restrictor system 200 at a position isolated from the annular seal gland 152 and o-ring sealing member 150 precludes any chance that movement of the restricting member 204 when intercepting and restricting the pressure pulse will transmit load to the sealing member 150 or otherwise coerce the sealing member 150 to move, deflect or deform as a result of the pressure pulse or lubricant volumetric flow along the surface 140.

Figure 7:
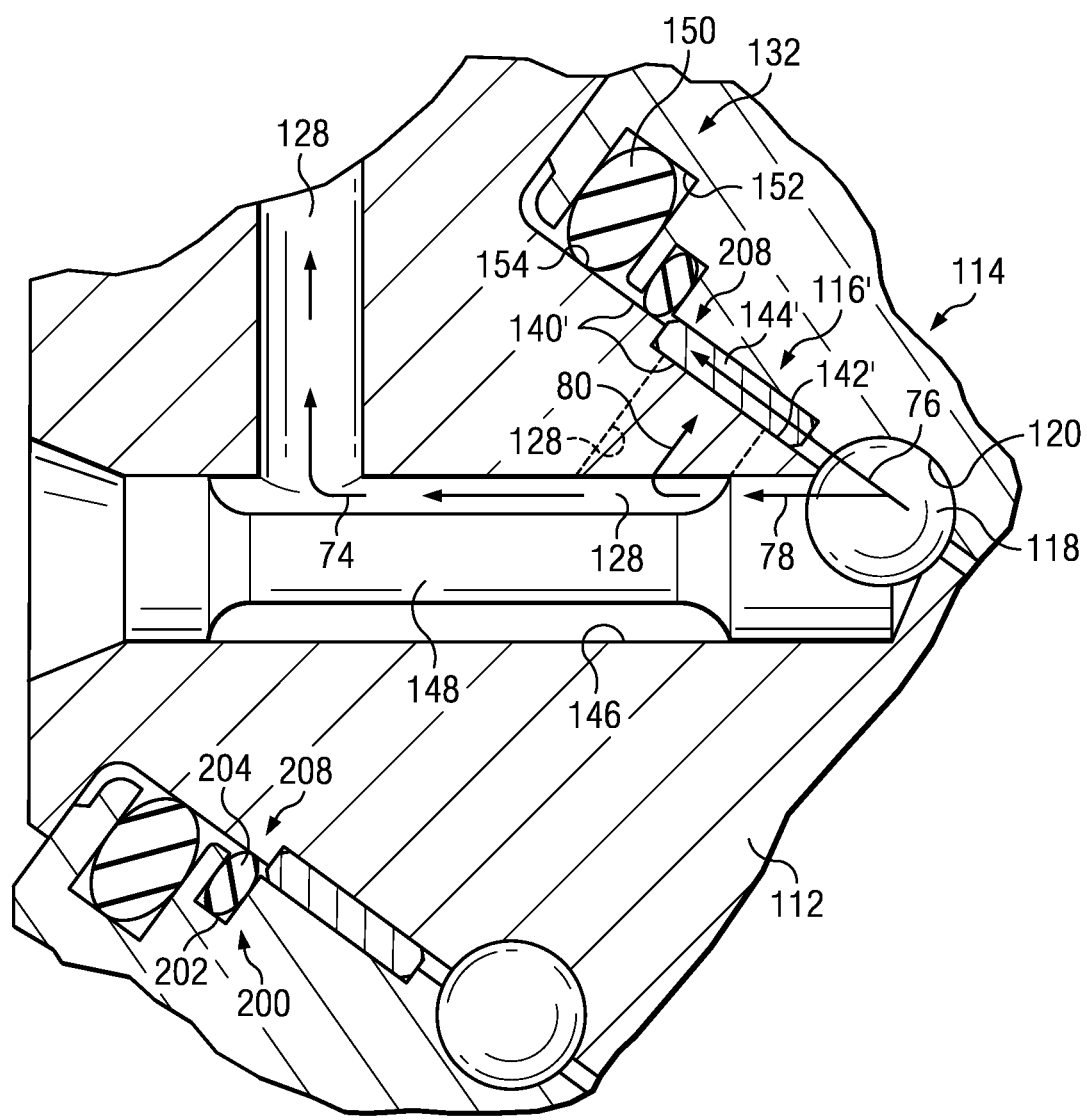

Reference is now made to FIG. 7 which shows a cross-section of a portion of a bit with a cylindrical friction bearing (also referred to as the main journal bearing). The cylindrical friction bearing 116' is defined by an outer cylindrical surface 140' on the bearing shaft 112 and an inner cylindrical surface 142' of a bushing 144' which has been press fit into the cone 114. This bushing 144' is a ring-shaped structure typically made of beryllium copper, although the use of other materials is known in the art. Ball bearings 118 ride in an annular raceway 120 defined at an interface between the bearing shaft 112 and cone 114. The ball bearings 118 are delivered to the raceway 120 through a ball opening 146, with that opening 146 being closed by a ball plug 148. The ball plug 148 is shaped to define a portion of the lubricant channels 128 within the ball opening 146.

As with the roller bearing implementation of FIG. 4, the frictional journal bearing implementation of FIG. 7 includes the pressure restrictor system 200 comprising an additional annular gland 202 formed near the base of the cone 114 between the annular seal gland 152 and the bushing 144'. A ring type pressure restricting member 204 is positioned in the gland 202 (see, also FIGS. 5A to 5E and FIG. 6 as described above).

As discussed previously, cone pumping changes the interstitial volume between the cone 114 and shaft 112 and squeezes the lubricant grease resulting in the generation of a lubricant pressure pulse. Responsive to this pressure pulse, grease flows along a first path 74 between the bearing system and the pressure compensator 30 through the series of lubricant channels 28 (and 128) (see, also FIG. 1). The pressure compensator 30 is designed to relieve or dampen the pressure pulse by compensating for volume changes through its elastomer diaphragm. However, there are other possible paths for grease flow in response to the pressure pulse, and one or more of these paths are directed towards the sealing system 132. For example, grease may flow along a second path 76 through the raceway 120 and along the surface 140' towards the sealing system 132. Additionally, grease may flow along a third path 78/80 through the raceway 120, the series of lubricant channels 128 and along the surface 140' towards the sealing system 132.

The pressure restrictor system 200, positioned between the annular seal gland 152 and the bushing 144', functions to intercept and restrict the pressure pulse and the flow of grease in response thereto along the surface 140' before reaching the sealing system 132. In this configuration, the pressure restrictor system 200 supplements the restricting capabilities provided by attenuation zones 208 defined between outer surfaces of the shaft 112 that are adjacent inner surfaces of the cone 114. It is important to note that the pressure restrictor system 200 with restricting member 204 in annular gland 202 is not designed or configured to function as a seal with respect to the lubricant. Passage of lubricant from one side to the other side of the restricting member 204 along surface 140' (or through the passages 206 or around the member 204) is permitted (i.e., the restricting member 204 is "leaky"), but the restricting member 204 nonetheless restricts or attenuates grease flow along surface 140' in response to cone pumping pressure pulsation.

FIG. 8 illustrates a cross-sectional view of a roller cone rock bit focusing on an embodiment of the present invention for addressing lubricant pressure pulsation originating at the bearing system. FIG. 8 differs from the embodiment shown in FIG. 4 with respect to the placement of the pressure restrictor system 200. FIG. 8, like FIG. 4, provides a pressure restrictor system 200 including an additional annular gland 202 formed near the base of the cone 114 between the annular seal gland 152 and the annular roller raceway 144 with a ring type pressure restricting member 204 positioned in the gland 202. However, in FIG. 8, the additional annular gland 202 is adjacent to and extends from the annular roller raceway 144 in the cone 114. Thus, the pressure restricting member 204 positioned in the gland 202 is adjacent the set of roller bearings 142 provided within the annular roller raceway 144. FIG. 9 is a partial cross-sectional view showing the relationship between the roller bearings 142 and the pressure restricting member 204 within the annular roller raceway 144 and the gland 202, respectively.

The pressure restrictor system 200, positioned separate from the annular seal gland 152 and adjacent the annular roller raceway 144, functions to intercept and restrict the pressure pulse and the flow of grease in response thereto along the surface 140 before reaching the sealing system 132. It is important to note that the pressure restrictor system 200 with restricting member 204 in annular gland 202 is not designed or configured to function as a seal with respect to the lubricant. Passage of lubricant from one side to the other side of the restricting member 204 along surface 140 (or through the passages 206 or slots 212 or around the member 204) is permitted (i.e., the restricting member 204 is "leaky"), but the restricting member 204 nonetheless restricts or attenuates grease flow along surface 140 in response to cone pumping pressure pulsation.

Figure 10:
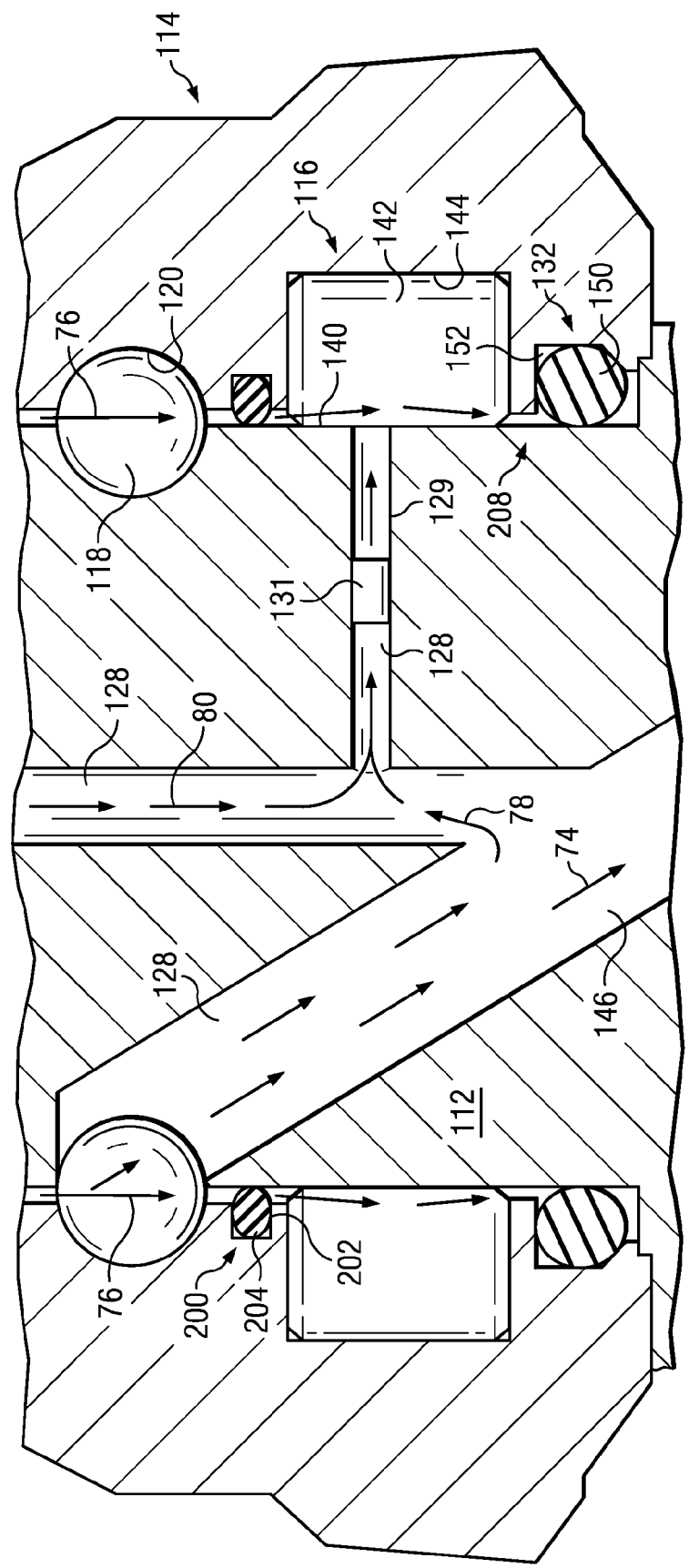

FIG. 10 illustrates a cross-sectional view of a roller cone rock bit focusing on an embodiment of the present invention for addressing lubricant pressure pulsation originating at the bearing system. FIG. 10 differs from the embodiment shown in FIG. 4 with respect to the placement of the pressure restrictor system 200. FIG. 10, like FIG. 4, provides a pressure restrictor system 200 including an additional annular gland 202 formed in the cone 114. However, the pressure restrictor system 200 is positioned between the annular ball raceway 120 and the annular roller raceway 144. The pressure restrictor system 200 includes a ring type pressure restricting member 204 positioned in the gland 202.

The pressure restrictor system 200, positioned between the annular ball raceway 120 and the annular roller raceway 144, functions to intercept and restrict the pressure pulse and the flow of grease in response thereto along the surface 140 before reaching the sealing system 132. In this configuration, the pressure restrictor system 200 supplements the restricting capabilities provided by attenuation zones 208 defined between outer surfaces of the shaft 112 that are adjacent inner surfaces of the cone 114. It is important to note that the pressure restrictor system 200 with restricting member 204 in annular gland 202 is not designed or configured to function as a seal with respect to the lubricant. Passage of lubricant from one side to the other side of the restricting member 204 along surface 140 (or through the passages 206 or slots 212 or around the member 204) is permitted (i.e., the restricting member 204 is "leaky"), but the restricting member 204 nonetheless restricts or attenuates grease flow along surface 140 in response to cone pumping pressure pulsation.

It will be noted in FIG. 10 that the pressure restrictor system 200, when positioned between the annular ball raceway 120 and the annular roller raceway 144, cannot intercept and restrict the pressure pulse and the flow of grease in response thereto with respect to the paths 78 and 80 (which flow through the radial lubricant channel 128 towards the roller bearing system). The attenuation zone 208 between outer surfaces of the shaft 112 that are adjacent inner surfaces of the cone 114 will assist in intercepting and restricting the pressure pulse and the flow of grease in response from along paths 78 and 80. Additional assistance is provided by making the radial lubricant channel 128 at reference 129 smaller. This smaller channel 128 (reference 129) constricts the flow of grease along paths 78 and 80. As an alternative, or in addition, a pressure restrictor 131 may be inserted into the radial lubricant channel 128 to restrict the flow of grease along paths 78 and 80 toward the surface 140 and sealing system 132.

FIG. 11 illustrates a cross-sectional view of a roller cone rock bit focusing on an embodiment of the present invention for addressing lubricant pressure pulsation originating at the bearing system. FIG. 11 differs from the embodiment shown in FIG. 8 with respect to the placement of the pressure restrictor system 200. FIG. 11, like FIG. 8, provides a pressure restrictor system 200 including an additional annular gland 202 formed in the cone 114 adjacent to and extending from the annular roller raceway 144. However, in FIG. 11 the annular gland 202 is positioned on the opposite edge of the raceway 144 near the ball raceway 120. Thus, the pressure restricting member 204 positioned in the gland 202 is adjacent the set of roller bearings 142 provided within the annular roller raceway 144. FIG. 12 is a partial cross-sectional view showing the relationship between the roller bearings 142 and the pressure restricting member 204 within the annular roller raceway 144 and the gland 202, respectively.

The pressure restrictor system 200, positioned separate from the annular seal gland 152 and adjacent the annular roller raceway 144, functions to intercept and restrict the pressure pulse and the flow of grease in response thereto along the surface 140 before reaching the annular roller raceway 144 and the sealing system 132. It is important to note that the pressure restrictor system 200 with restricting member 204 in annular gland 202 is not designed or configured to function as a seal with respect to the lubricant. Passage of lubricant from one side to the other side of the restricting member 204 along surface 140 (or through the passages 206 or slots 212 or around member 204) is permitted (i.e., the restricting member 204 is "leaky"), but the restricting member 204 nonetheless restricts or attenuates grease flow along surface 140 in response to cone pumping pressure pulsation.

It will be noted in FIG. 11 that the pressure restrictor system 200, when positioned between the annular ball raceway 120 and the annular roller raceway 144, cannot intercept and restrict the pressure pulse and the flow of grease in response thereto with respect to the paths 78 and 80 (flowing in radial lubricant channel 128 towards the roller bearing system). The attenuation zone 208 between outer surfaces of the shaft 112 that are adjacent inner surfaces of the cone 114 will assist in intercepting and restricting the pressure pulse and the flow of grease in response from along paths 78 and 80. Additional assistance is provided by making the radial lubricant channel 128 at reference 129 smaller. This smaller channel 128 (reference 129) constricts the flow of grease along paths 78 and 80. As an alternative, or in addition, a pressure restrictor 131 may be inserted into the radial lubricant channel 128 to restrict the flow of grease along paths 78 and 80 toward the surface 140 and sealing system 132.

Figure 13:
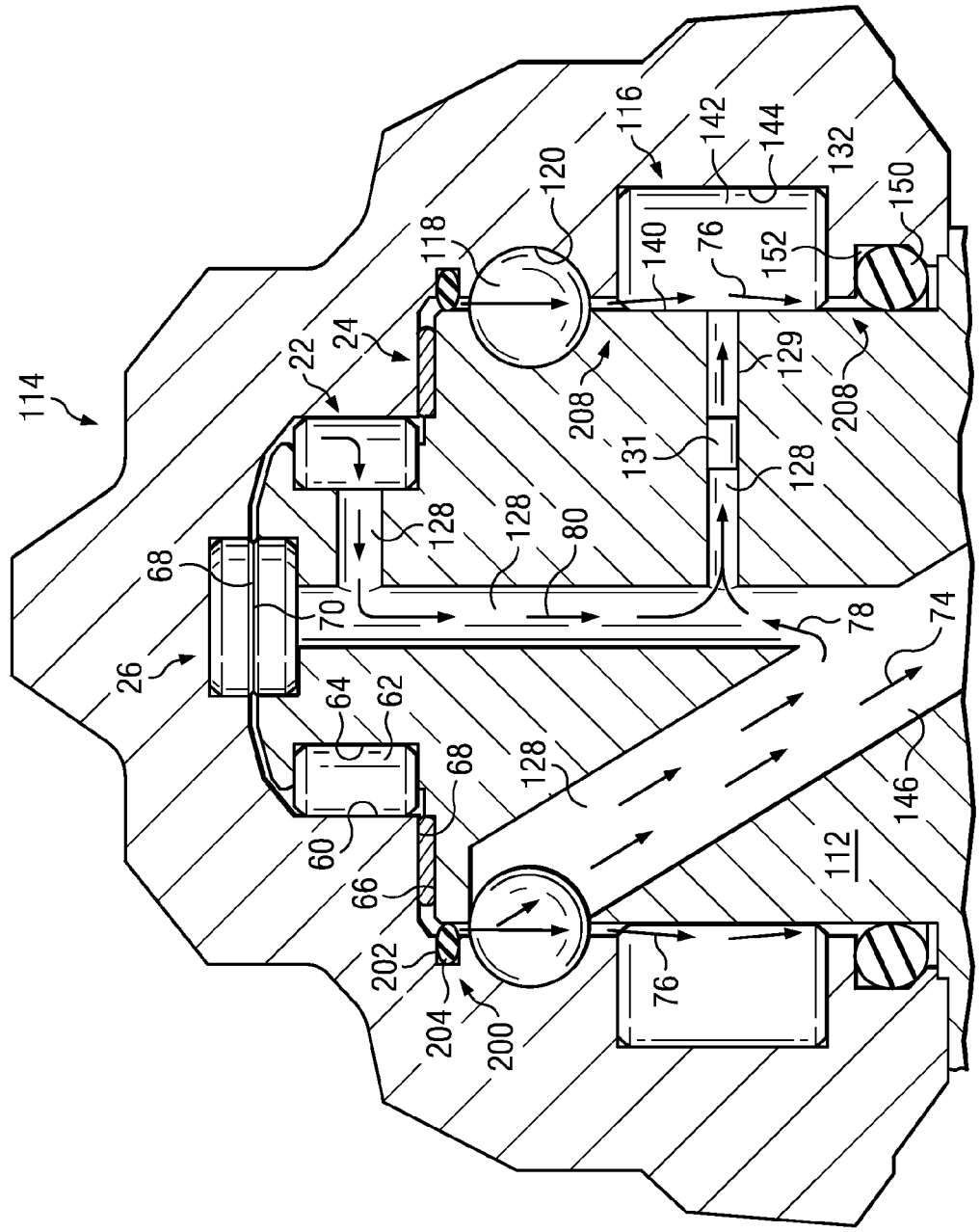

FIG. 13 illustrates a cross-sectional view of a roller cone rock bit focusing on an embodiment of the present invention for addressing lubricant pressure pulsation originating at the bearing system. FIG. 13 differs from the embodiment shown in FIG. 10 with respect to the placement of the pressure restrictor system 200. FIG. 13, like FIG. 10, provides a pressure restrictor system 200 including an additional annular gland 202 formed in the cone 114. However, the pressure restrictor system 200 is positioned between the annular ball raceway 120 and the first (thrust) friction bearing 24. The pressure restrictor system 200 includes a ring type pressure restricting member 204 positioned in the gland 202.

The pressure restrictor system 200, positioned between the annular ball raceway 120 and the first (thrust) friction bearing 24, functions to intercept and restrict the pressure pulse and the flow of grease in response thereto before reaching the sealing system 132. In this configuration, the pressure restrictor system 200 supplements the restricting capabilities provided by attenuation zones 208 defined between outer surfaces of the shaft 112 that are adjacent inner surfaces of the cone 114. It is important to note that the pressure restrictor system 200 with restricting member 204 in annular gland 202 is not designed or configured to function as a seal with respect to the lubricant. Passage of lubricant from one side to the other side of the restricting member 204 (or through the passages 206 or slots 212 or around member 204) is permitted (i.e., the restricting member 204 is "leaky"), but the restricting member 204 nonetheless restricts or attenuates grease flow along surface 140 in response to cone pumping pressure pulsation.

It will be noted in FIG. 13 that the pressure restrictor system 200, when positioned between the annular ball raceway 120 and the first (thrust) friction bearing 24, cannot intercept and restrict the pressure pulse and the flow of grease in response thereto with respect to the paths 78 and 80 which flow in the radial lubricant channel 128 extending towards the roller bearing system. The attenuation zone 208 between outer surfaces of the shaft 112 that are adjacent inner surfaces of the cone 114 will assist in intercepting and restricting the pressure pulse and the flow of grease in response from along paths 78 and 80. Additional assistance is provided by making the radial lubricant channel 128 at reference 129 smaller. This smaller channel 128 (reference 129) constricts the flow of grease along paths 78 and 80. As an alternative, or in addition, a pressure restrictor 131 may be inserted into the radial lubricant channel 128 to restrict the flow of grease along paths 78 and 80 toward the surface 140 and sealing system 132.

Figure 14:
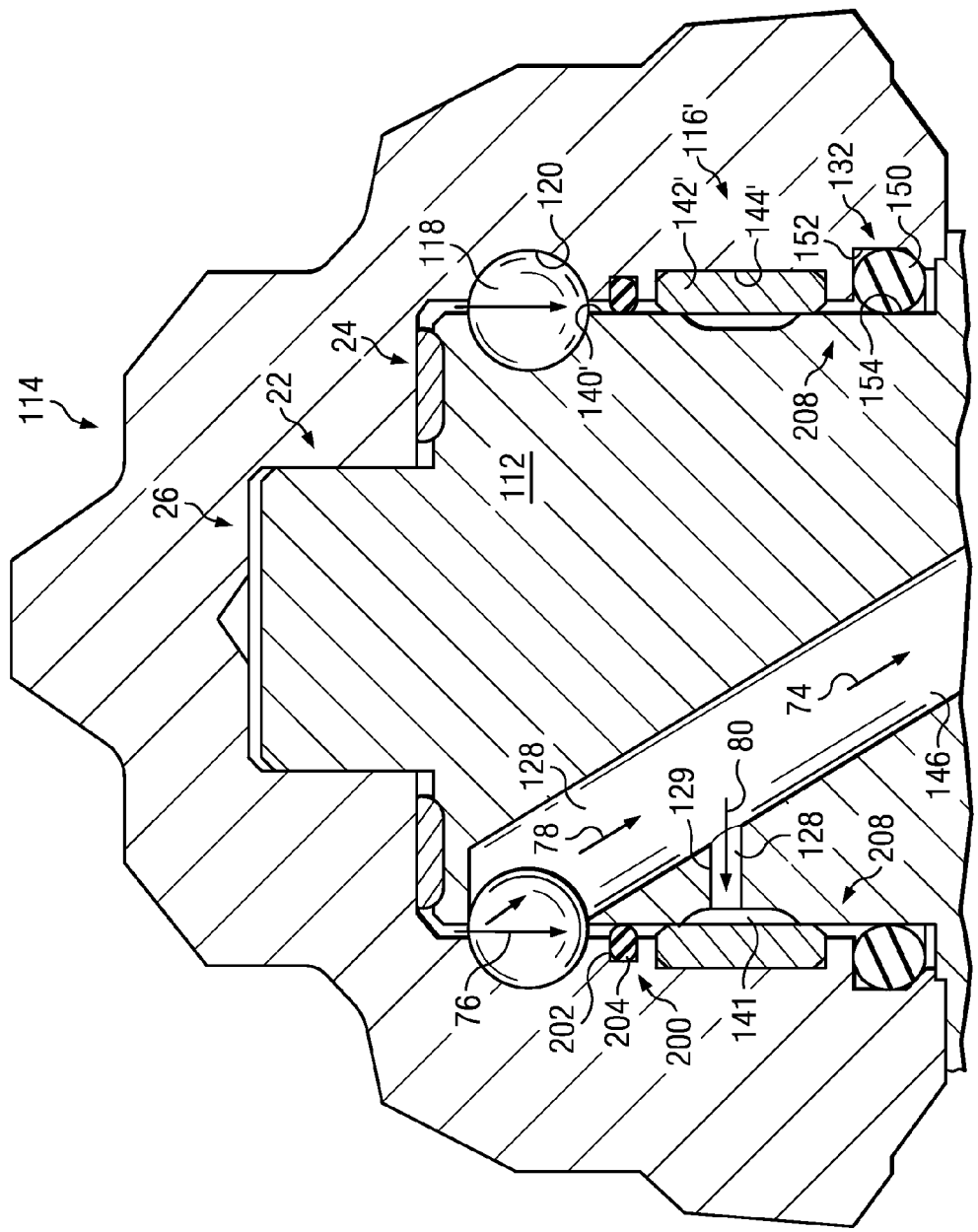

FIG. 14 illustrates a cross-sectional view of a roller cone rock bit focusing on an embodiment of the present invention for addressing lubricant pressure pulsation originating at the bearing system. FIG. 14 differs from the embodiment shown in FIG. 7 with respect to the placement of the pressure restrictor system 200. FIG. 14, like FIG. 7, provides a pressure restrictor system 200 including an additional annular gland 202 formed in the cone 114. However, the pressure restrictor system 200 is positioned between the annular ball raceway 120 and the cylindrical friction bearing 116'. The pressure restrictor system 200 includes a ring type pressure restricting member 204 positioned in the gland 202.

The pressure restrictor system 200, positioned between the annular ball raceway 120 and the cylindrical friction bearing 116', functions to intercept and restrict the pressure pulse and the flow of grease in response thereto along the surface 140' and path 76 before reaching the sealing system 132. In this configuration, the pressure restrictor system 200 supplements the restricting capabilities provided by attenuation zones 208 defined between outer surfaces of the shaft 112 that are adjacent inner surfaces of the cone 114. It is important to note that the pressure restrictor system 200 with restricting member 204 in annular gland 202 is not designed or configured to function as a seal with respect to the lubricant. Passage of lubricant from one side to the other side of the restricting member 204 along surface 140' (or through the passages 206 or around member 204) is permitted (i.e., the restricting member 204 is "leaky"), but the restricting member 204 nonetheless restricts or attenuates grease flow along surface 140' in response to cone pumping pressure pulsation.

It will be noted in FIG. 14 that the pressure restrictor system 200, when positioned between the annular ball raceway 120 and the cylindrical friction bearing 116', cannot intercept and restrict the pressure pulse and the flow of grease in response thereto with respect to the paths 78 and 80 which flow in the radial lubricant channel 128 towards the friction journal bearing. The attenuation zone 208 between outer surfaces of the shaft 112 that are adjacent inner surfaces of the cone 114 will assist in intercepting and restricting the pressure pulse and the flow of grease in response from along paths 78 and 80. Additional assistance is provided by making the radial lubricant channel 128 at reference 129 smaller. This smaller channel 128 (reference 129) constricts the flow of grease along path 80. As an alternative, or in addition, a pressure restrictor 131 (see, for example, FIG. 13) may be inserted into the radial lubricant channel 128 to restrict the flow of grease along path 80 toward the surface 140' and sealing system 132.

The radial lubricant channel 128 (at reference 129) terminates at the surface 140' of the shaft 112 at a groove 141 formed in the surface 140' adjacent the friction journal bearing. Although not explicitly shown in FIG. 7, those skilled in the art recognize that the outer surface 140' of the shaft 112 in FIG. 7 will likewise include a groove 141 at the termination of the radial lubricant channel 128.

Although explained in the context of a drilling tool designed primarily for use in an oilfield drilling application, it will be understood that the disclosure is not so restricted and that the systems as described could be used in any rotary cone drilling tool including tools used in non-oil field applications. Specifically, the drilling tool can be configured for use with any suitable drilling fluid including air, mist, foam or liquid (water, mud or oil-based), or any combination of the foregoing. Furthermore, although described in the context of a solution to the problems associated with cone pumping and lubricant pressure pulsation in sealed and pressure compensated systems, the solutions described herein are equally applicable to rotary cone bits which are lubricated but do not include a pressure compensator and diaphragm system.

While the figures illustrate the preferred implementation of the pressure restrictor system 200 on the cone side, it will be understood that the pressure restrictor system 200 could instead be installed with the annular gland 202 formed on the shaft.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A drill tool, comprising:
   a bit body;
   at least one bearing shaft extending from the bit body;
   a cone mounted for rotation on the bearing shaft;
   a radial thrust bearing from which cone pumping pressure pulsation originates;
   a lubricant sealing system comprising an annular seal gland and a seal ring retained within the annular seal gland; and
   a lubricant cone pumping pressure restrictor system comprising an annular gland separate from the annular seal gland and a pressure restricting ring retained within the annular gland,
   wherein the lubricant cone pumping pressure restrictor system is positioned along the bearing shaft between the radial thrust bearing system and the lubricant sealing system,
   wherein the lubricant cone pumping pressure restrictor system functions to attenuate cone pumping lubricant pressure pulsation from acting on the seal ring retained within the annular seal gland; and
   wherein the pressure restricting ring retained within the annular gland does not provide a seal with respect to a flow of lubricant both towards and away from the seal ring.

2. The drill tool of claim 1, further comprising a ball raceway and a set of balls retained within the ball raceway to form a ball bearing, and wherein the lubricant cone pumping pressure restrictor system is positioned along the bearing shaft between the lubricant sealing system and the ball bearing.

3. The drill tool of claim 2, wherein the annular gland of the lubricant cone pumping pressure restrictor system is formed in an inner surface of the cone.

4. The drill tool of claim 1, wherein the pressure restricting ring includes a slot opening permitting restricted passage of lubricant.

5. The drill tool of claim 1, wherein the pressure restricting ring includes a passage extending through the ring permitting restricted passage of lubricant.

6. The drill tool of claim 2, further comprising a roller raceway and a set of rollers retained within the roller raceway to form a roller bearing, and wherein the lubricant cone pumping pressure restrictor system is positioned along the bearing shaft between the ball bearing and the roller bearing.

7. The drill tool of claim 6, wherein the annular gland of the lubricant cone pumping pressure restrictor system is an extension of the roller raceway for the roller bearing.

8. The drill tool of claim 7, wherein the pressure restricting ring retained within the annular gland is positioned in adjacent contact with the set of rollers retained within the roller raceway.

9. The drill tool of claim 6, wherein the annular gland of the lubricant cone pumping pressure restrictor system is formed in an inner surface of the cone.

10. The drill tool of claim 6, wherein the pressure restricting ring retained within the annular gland does not provide a seal with respect to a flow of lubricant between the lubricant sealing system and the ball bearing.

11. The drill tool of claim 10, wherein the pressure restricting ring includes a slot opening permitting restricted passage of lubricant.

12. The drill tool of claim 10, wherein the pressure restricting ring includes a passage extending through the ring permitting restricted passage of lubricant.

13. The drill tool of claim 2, further comprising a friction journal bearing, and wherein the lubricant cone pumping pressure restrictor system is positioned along the bearing shaft between the ball bearing and the friction journal bearing.

14. The drill tool of claim 13, wherein the annular gland of the lubricant cone pumping pressure restrictor system is formed in an inner surface of the cone.

15. The drill tool of claim 13, wherein the pressure restricting ring retained within the annular gland does not provide a seal with respect to a flow of lubricant between the lubricant sealing system and the ball bearing.

16. The drill tool of claim 15, wherein the pressure restricting ring includes a slot opening permitting restricted passage of lubricant.

17. The drill tool of claim 16, wherein the pressure restricting ring includes a passage extending through the ring permitting restricted passage of lubricant.

18. The drill tool of claim 1, further comprising: an internal radial lubricant channel between a bearing surface and an internal central lubricant channel; and a pressure restrictor inserted within that internal radial lubricant channel.

19. The drill tool of claim 2, further comprising a roller raceway and a set of rollers retained within the roller raceway to form a roller bearing, and wherein the lubricant cone pumping pressure restrictor system is positioned along the bearing shaft between the lubricant sealing system and the roller bearing.

20. The drill tool of claim 19, wherein the annular gland of the lubricant cone pumping pressure restrictor system is an extension of the roller raceway for the roller bearing.

21. The drill tool of claim 20, wherein the pressure restricting ring retained within the annular gland is positioned in adjacent contact with the set of rollers retained within the roller raceway.

22. The drill tool of claim 19, wherein the annular gland of the lubricant cone pumping pressure restrictor system is formed in an inner surface of the cone.

23. The drill tool of claim 19, wherein the pressure restricting ring retained within the annular gland does not provide a seal with respect to a flow of lubricant between the lubricant sealing system and the ball bearing.

24. The drill tool of claim 23, wherein the pressure restricting ring includes a slot opening permitting restricted passage of lubricant.

25. The drill tool of claim 23, wherein the pressure restricting ring includes a passage extending through the ring permitting restricted passage of lubricant.

26. The drill tool of claim 2, further comprising a friction journal bearing, and wherein the lubricant cone pumping pressure restrictor system is positioned along the bearing shaft between the lubricant sealing system and the friction journal bearing.

27. The drill tool of claim 26, wherein the annular gland of the lubricant cone pumping pressure restrictor system is formed in an inner surface of the cone.

28. The drill tool of claim 26, wherein the pressure restricting ring retained within the annular gland does not provide a seal with respect to a flow of lubricant between the lubricant sealing system and the ball bearing.

29. The drill tool of claim 28, wherein the pressure restricting ring includes a slot opening permitting restricted passage of lubricant.

30. The drill tool of claim 28, wherein the pressure restricting ring includes a passage extending through the ring permitting restricted passage of lubricant.

31. The drill tool of claim 1, further comprising a ball raceway; and a set of balls retained within the ball raceway to form a ball bearing, and wherein the lubricant cone pumping pressure restrictor system is positioned along the bearing shaft between the radial thrust bearing and the ball bearing.

32. The drill tool of claim 31, wherein the annular gland of the lubricant cone pumping pressure restrictor system is formed in an inner surface of the cone.

33. The drill tool of claim 31, wherein the pressure restricting ring retained within the annular gland does not provide a seal with respect to a flow of lubricant between the lubricant sealing system and the ball bearing.

34. The drill tool of claim 33, wherein the pressure restricting ring includes a slot opening permitting restricted passage of lubricant.

35. The drill tool of claim 33, wherein the pressure restricting ring includes a passage extending through the ring permitting restricted passage of lubricant.

36. The drill tool of claim 1, wherein the seal member is an o-ring seal.

\* \* \* \* \*